Aug. 7, 1934.                R. M. JOHNSON                1,969,221
                             MARKING MACHINE
                            Filed June 21, 1929

Inventor
Ray M. Johnson

By
          Attorney

Patented Aug. 7, 1934

1,969,221

UNITED STATES PATENT OFFICE 1,969,221

MARKING MACHINE

Ray M. Johnson, Akron, Ohio, assignor to Wingfoot Corporation, Wilmington, Del., a corporation of Delaware Application June 21, 1929, Serial No. 372,607

2 Claims. (Cl. 33—127)

This invention relates to the manufacture of inner tubes for pneumatic tires and it has particular relation to a machine for marking inner tube stock at predetermined intervals as the stock is conveyed from a rubber extruding machine.

An object of the invention is to provide a machine for marking stock supported upon a conveyor which is so adjustable that the stock may be marked into various lengths as found desirable.

One method of manufacturing inner tubes for pneumatic tires comprises extruding a tube of rubber by means of an extruding machine and thereafter severing the tube into predetermined lengths. Subsequently, the individual tubes are made endless by joining the ends thereof. The present practice of marking the extruded strip at predetermined intervals prior to the severing thereof comprises a manual operation performed in conjunction with a measuring bar of desired length. This bar is positioned upon the moving stock and a mark made upon the latter at each end of the bar. While this method of marking stock is practiced with success, it requires considerable manual labor and expense.

According to this invention, an automatic means, provided for marking the extruded inner tube stock, comprises a marker positioned above the moving strip of extruded stock which is pressed against the latter periodically by electrically operated means. Rotary means operating in synchronism with the means for conveying the extruded stock, at intervals, actuates an electric contact switch in an electrical circuit which controls the operation of the electrically operated marking means. When the circuit is completed, the marker is pressed against the inner tube stock for a very short period of time sufficient to cause a mark to be pressed upon the stock and then the circuit is broken. Resilient means connected to the marker arm return the latter to its inoperative position when the circuit is broken.

For a better understanding of the invention, reference may now be had to the accompanying drawing, forming a part of the specification, in which.

Figure 1:
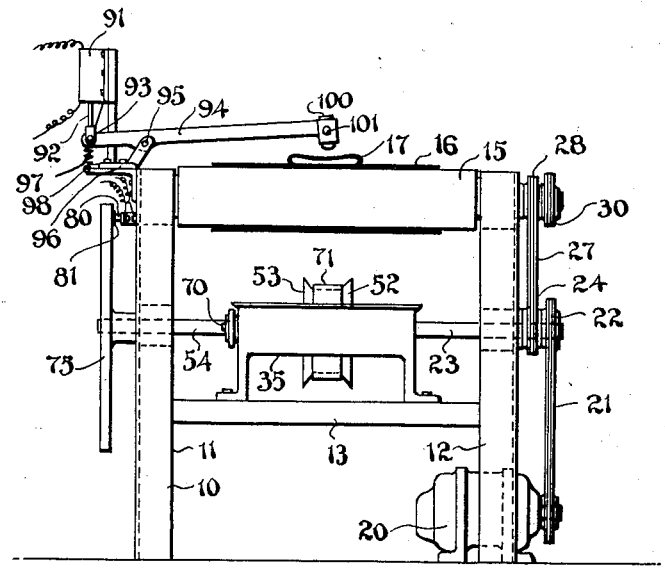
Fig. 1 is an end view of a conveyor for conducting extruded inner tube stock, having associated therewith an automatically operated means for marking the stock.
Figure 3:
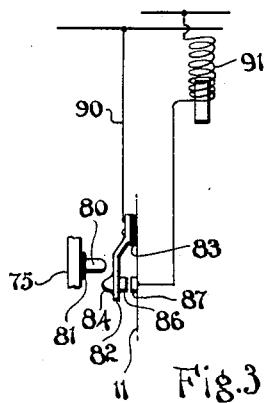
Fig. 3 is a diagrammatical illustration of an electrical circuit employed for operating the tube marking means.

Referring to Fig. 1, a framework 10 is provided which is composed of uprights 11 and 12 interconnected intermediate their ends by a horizontal frame member 13. Rollers 15, journaled in the upper ends of the uprights 11 and 12, are adapted to drive a conveyor belt 16. The latter is employed to transport a continuous strip of inner tube stock 17 which is projected from a rubber extruding machine (not shown) normally disposed at one end of the conveyor.

In order to drive the rollers 15 and thereby move the conveyor 16, a motor 20 is provided which is supported at the base of the framework 10. This motor is connected by a chain 21 to a sprocket 22 rigidly secured on a shaft 23 journaled in the upright 12. A second sprocket wheel 24, also rigidly secured to the shaft 23, in turn is connected by a chain 27 to a sprocket wheel 28 rigidly mounted upon the shaft of the roller 15. Rotary movement of the roller 15 may be imparted to other rollers spaced longitudinally of the conveyor by means of a sprocket wheel 30 which is operatively connected by chains, not shown, to other sprocket wheels rigidly mounted upon the shafts of the other rollers.

Figure 2:
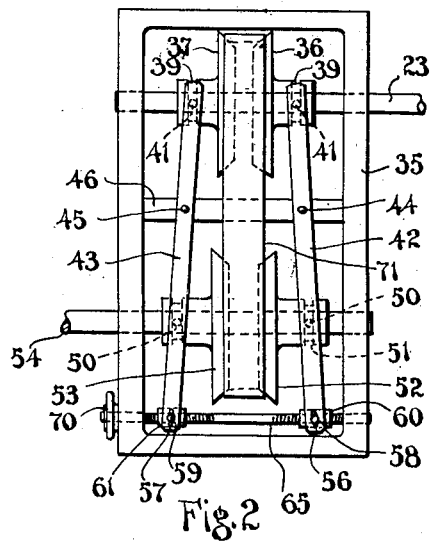
Fig. 2 is a plan view of a variable speed device for controlling the marking means.

As best shown by Fig. 2, the shaft 23 is operatively connected to a speed regulating device 35 which is supported upon the horizontal frame member 13. A pair of conical pulleys 36 and 37, having their conical surfaces converging toward each other, are splined upon the shaft 23. Bosses on the pulleys are provided with circumferentially extending grooves 39 which serve as bearings for pins 41 rigidly secured to levers 42 and 43. Intermediate parts of the levers 42 and 43 are pivoted, as indicated at 44 and 45, upon a bar 46 supported rigidly upon the frame of the speed regulating device. Additional pins 50, secured adjacent the ends of the levers opposite the pins 41, are disposed in grooves 51 of conical pulleys 52 and 53 that are splined upon a shaft 54. This shaft also is journaled in the frame of the speed regulating device.

At their ends adjacent the pins 50, the levers 42 and 43 are provided with slots 56 and 57 for receiving lugs 58 and 59 integral with internally screw threaded blocks 60 and 61. A shaft 65 is threaded through the blocks 60 and 61 in such manner that rotation of the shaft with respect thereto causes the latter to move toward or away from each other according to the direction of rotation of the shaft. The shaft 65 is journaled in the frame of the speed regulating device and for the purposes of facilitating its operation, a hand wheel 70 is secured to one of its ends.

A belt 71, trained about the pairs of pulleys 36—37 and 52—53 transmits rotary movement from the shaft 23 to the shaft 54. It is apparent that by rotating the hand wheel 70 the positions of the pulleys 36—37 and 52—53 may be regulated and thereby the relative speeds of the shafts 23 and 54 varied.

Referring again to Fig. 1, the shaft 54 extends through the frame member 11 and has a wheel 75 secured to its end projecting beyond the frame 11. Adjacent its outer periphery and on its side adjacent the frame member 11, the wheel 75 is provided with a lug 80 which is secured to the wheel by means of an insulator plate 81. The frame member 11, at its upper end, is provided with a resilient electrical contact blade 82 which is secured at one end to the frame member by means of an insulator plate 83. This blade, at its end opposite that which is secured the frame member 11, has a bead 84, which is disposed in the path of movement of the lug 80 on the wheel 75. The blade also is provided with a contact point 86 which is normally spaced from a second contact 87 disposed on the frame member 11. The contacts 86 and 87 normally are separated by the resiliency of the blade 82 but are adapted to be brought into contacting relation by engagement of the lug 80 on the wheel 75 with the bead 84 on the blade 82.

When engaged with each other, the contacts 86 and 87 close an electrical circuit 90 which includes a solenoid 91. The latter is adapted to operate a core 92 which, at its lower end, is pivotally connected by a pin 93 to one end of an arm 94. This arm, intermediate its ends, is pivoted as indicated at 95 to a bracket 96 projecting upwardly from the upper end of the frame member 11. A spring 97, connected at one end to the pin 93 and at its opposite end to the bracket 96, as indicated at 98, normally retains the core 92 of the solenoid in its lowermost position.

The end of the bar 94 opposite the pin 93 is provided with a marking element 100, which is secured thereto by a screw 101 or by any other suitable device. The marking element may be in the form of a piece of chalk or other markings material or it may be in the form of an imprinting plate which is adapted to stamp an ink impression. The marker is normally so disposed immediately above the tube of extruded stock 17 that it impresses a mark upon the tube stock 17 when it is moved downwardly by energization of the solenoid 91.

In operation of this above described mechanism, it is apparent that the motor 20 drives the conveyor 16 and the wheel 75 synchronously. By reason of the speed regulating device 35, the speed of the wheel 75 may be varied with respect to the speed of the conveyor 16. During the movement of the conveyor 16 and the extruded tube stock thereon, normally the solenoid 91 is not energized and because of the spring 97, the marker 100 is spaced vertically from the tube material 17. When the lug 80 on the wheel 75 engages the bead 84 on the blade 82 of the contact switch, an electrical circuit is completed through the solenoid 91 which results in movement of the marker 100 downwardly against the tube stock 17. Owing to the fact that the engagement of the lug 80 with the bead 84 is substantially instantaneous, the marker 100 is in contact with the tube stock 17 only for a like period of time. When it is desired to change the intervals of time during which the marking mechanism is inoperative, the hand wheel 70 is rotated thereby varying the relative speeds of the shafts 23 and 54. This, in turn, varies the speed of rotation of the wheel 75 and consequently, the intervals during which the marker is inoperative. Since the shaft 23 is driven in synchronism with the conveyor 16, it is immaterial at what speed the tube stock is conveyed from the extruding machine.

From the foregoing description, it is apparent that the mechanism for automatically marking inner tube stock dispenses with manual marking operations and that the marks will be distributed accurately and uniformly along the extruded stock. Such a mechanism, when once adjusted to mark tube stock at predetermined intervals, will operate continuously without variation until it has been readjusted.

Although I have illustrated but the preferred form of the invention and have described that form in detail, it will be apparent to those skilled in the art that the invention is not so limited but that various modifications may be made therein without departing from the spirit of the invention or from the scope of the appended claims.

What I claim is:

1. In combination, a frame, a conveyor movable with respect to the frame and adapted to convey elongate material, an arm pivoted to the frame and having one end disposed above the material, a marker associated with said end of the arm, electrical means for moving the arm, means for supplying electric current to said electrical means, said supply means including a movable contact and a stationary contact, a cam member for periodically moving the movable contact into engagement with the stationary contact to energize the electrical means, and means for rotating the cam member in synchronism with the movement of the conveying means.

2. In combination, a frame, an endless conveyor movable with respect to the frame for conveying elongate material, a marking means movably connected to the frame and having a portion thereof disposed above the material, electrical means for moving the marking means against the material, means for supplying electric current to said electrical means to energize the same, a switch in said supply means, a rotatable member for closing the normally open switch at periodic intervals, means for rotating the last mentioned member in synchronism with the movement of the conveying means, and means for quickly moving the marking means away from the material following the marking operation.

RAY M. JOHNSON.